US009463788B2

(12) United States Patent
Takizawa et al.

(10) Patent No.: US 9,463,788 B2
(45) Date of Patent: Oct. 11, 2016

(54) CONTROL DEVICE FOR HYBRID VEHICLE (75) Inventors: Keiji Takizawa, Toyota (JP);
Tomohiko Miyamoto, Toyota (JP);
Shuhei Matsusaka, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 14/347,774

(22) PCT Filed: Oct. 6, 2011

(86) PCT No.: PCT/JP2011/073138
§ 371 (c)(1),
(2), (4) Date: Mar. 27, 2014

(87) PCT Pub. No.: WO2013/051141
PCT Pub. Date: Apr. 11, 2013

(65) Prior Publication Data
US 2014/0229052 A1    Aug. 14, 2014

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2016.01) |

(Continued)

(52) U.S. Cl.
CPC .............. *B60W 20/10* (2013.01); *B60K 6/445* (2013.01); *B60W 10/30* (2013.01); *B60W 20/00* (2013.01); *B60K 11/02* (2013.01); *B60K 2001/006* (2013.01); *B60W 2510/087* (2013.01); *B60W 2510/244* (2013.01); *B60W 2710/083* (2013.01); *B60W 2710/088* (2013.01); *B60W 2710/30* (2013.01); *Y02T 10/6239* (2013.01)

(58) Field of Classification Search
CPC ..... B60K 6/445; B60W 10/30; B60W 20/10; B60W 2510/087; B60W 2510/244; B60W 2710/083; B60W 2710/088; Y02T 10/6239
USPC .......... 701/22; 180/242, 65.265; 318/5, 471
See application file for complete search history.

(56) References Cited

U.S. PATENT DOCUMENTS

| | | | | |
|---|---|---|---|---|
| 2002/0091034 A1* | 7/2002 | Nakamori | .............. | B60K 6/485 477/3 |
| 2003/0155891 A1* | 8/2003 | Ishishita | .............. | G01R 31/362 320/134 |

(Continued)

FOREIGN PATENT DOCUMENTS

| | | |
|---|---|---|
| CN | 101506022 A | 8/2009 |
| JP | A-11-069510 | 3/1999 |

(Continued)

*Primary Examiner* — Jerrah Edwards
*Assistant Examiner* — Rachid Bendidi
(74) *Attorney, Agent, or Firm* — Oliff PLC (57) ABSTRACT

A control device for a hybrid vehicle, including a mode whereby the vehicle runs using a motor only, and a mode whereby the vehicle uses both the motor and an engine. When the motor temperature of an MG(2) exceeds a threshold temperature, an ECU moves from a running mode that uses the MG(2) only, to a running mode that limits the load on the MG(2). The ECU performs control in accordance with the charging state of the battery for running, such that the work rate of an electric pump for cooling the MG(2) is increased when the charging state is higher, and the running mode that uses the MG(2) only is maintained.

5 Claims, 5 Drawing Sheets

(51) Int. Cl.
  *B60W 10/30* (2006.01)
  *B60K 6/445* (2007.10)
  *B60K 1/00* (2006.01)
  *B60K 11/02* (2006.01)

(56) References Cited

U.S. PATENT DOCUMENTS

| | | | |
|---|---|---|---|
| 2006/0152195 A1* | 7/2006 | Ishishita | G01R 31/3651 320/132 |
| 2008/0115997 A1* | 5/2008 | Banno | B60K 23/08 180/242 |
| 2008/0314658 A1 | 12/2008 | Atarashi et al. | |
| 2009/0139686 A1* | 6/2009 | Suzuki | B60K 6/445 165/42 |
| 2012/0150374 A1 | 6/2012 | Yamazaki et al. | |
| 2014/0150374 A1* | 6/2014 | Donoho | A01M 29/32 52/741.1 |
| 2014/0236410 A1* | 8/2014 | Takizawa | B60K 6/445 701/22 |

FOREIGN PATENT DOCUMENTS

| | | |
|---|---|---|
| JP | 2003-304604 A | 10/2003 |
| JP | 2007-216791 A | 8/2007 |
| JP | 2009-100542 A | 5/2009 |
| JP | A-2009-255916 | 11/2009 |
| JP | A-2009-292319 | 12/2009 |
| JP | A-2010-151200 | 7/2010 |
| JP | A-2010-213461 | 9/2010 |
| JP | A-2011-051395 | 3/2011 |

* cited by examiner

| SOC(%) | EOP WORK RATE (%) |
|---|---|
| x | Wx |
| y | Wy |
| ... | ... |

CONTROL DEVICE FOR HYBRID VEHICLE

TECHNICAL FIELD

The present invention relates to a control device for a hybrid vehicle.

BACKGROUND ART

Hybrid vehicles that run with power of at least one of an engine and a motor have been known. In a hybrid vehicle, the storage quantity or the state of charge (SC) of a battery provided for supplying power to the motor is controlled to be within a predetermined range. When the SOC of the battery is equal to a lower limit value of the predetermined range or is lower, the engine is forcedly driven to charge the battery with power which is generated by using a driving force of the engine, to thereby restore the SOC of the battery.

On the other hand, while the distance a hybrid vehicle can travel using a motor only must be maximized in order to enhance fuel efficiency, there has simultaneously been known technology for controlling to limit the load on the motor when the temperature of the motor exceeds a predetermined allowable temperature, in order to prevent performance deterioration of the motor.

Patent Document 1 indicated below discloses a hybrid driving apparatus which performs load limitation control for limiting a load applied to a motor when the temperature of the motor exceeds a predetermined temperature. Patent Document 1 discloses that a unit which detects a load mounted state or a traction state of a vehicle is provided and a load limitation start temperature is determined based on the load mounted state or the traction state which is detected. More specifically, when the vehicle is in a traction state and the travel resistance is greater than that in a non-traction state, the load limitation start temperature is set to be lower than the temperature in the non-traction state. Further, when the quantity of traction is great, the load limitation start temperature is set to be further lower than the temperature when the quantity of traction is small. With the above setting, in a state in which a heating limit temperature which is a limit temperature that the motor can resist is determined, the temperature of the motor can be maintained within the range of the heating limit temperature even when the travel resistance is increased due to the large quantity of mounted load or the traction state to thereby increase the rate of temperature rise.

Further, Patent Document 2 indicated below discloses a control device for a vehicle, which secures the emission clarification performance, without making a user feel uncomfortable, when CD (Charge Depleting mode) in which running with power of a motor only is preferentially performed is shifted to CS (Charge Sustain mode) in which running is performed with power of the engine and the motor, in a plug-in hybrid vehicle.

PRIOR ART DOCUMENTS

Patent Documents

Patent Document 1: JP 2009-255916 A
Patent Document 2: JP 2011-51395 A

DISCLOSURE OF THE INVENTION

Technical Problems

Here, while performing the load limitation control for limiting the load applied to the motor when the temperature of the motor exceeds the predetermined temperature is an effective technique for protection of the motor, uniform limitation of the load on the motor would result in a reduction in the distance which the vehicle runs using the motor only. For example, when the SOC of the battery which supplies power to the motor is sufficiently high, despite the sufficient power to be supplied to the motor from the battery, control is shifted to the load limitation control if the temperature of the motor reaches the predetermined temperature. Thus, there is a problem that, despite the situation that power of the battery can be actually utilized sufficiently, running using only the power of the motor cannot be maintained due to circumstances of the motor, which prevents effective use of the power of the battery.

In particular, concerning plug-in hybrid vehicles in which the battery can be charged with electric power from a power source external to the vehicle, such as a household power source, as the electric power from the household power source is generated efficiently by an electric power company, it is desired to preferentially utilize and make full use of the power of the battery.

An advantage of the present invention is therefore to provide a control device for a hybrid vehicle which runs with power from at least one of an engine and a motor, which is capable of further increasing a distance the vehicle can run with power of the motor only.

Solution to Problems

The present invention provides a control device for a hybrid vehicle comprising an engine and a motor, the vehicle having a running mode in which the vehicle runs with a motor load being limited when a temperature of the motor exceeds a threshold, wherein the vehicle changes a mode of coolant supply to the motor in accordance with a state of charge of a battery for supplying electric power to the motor.

According to one embodiment of the present invention, the vehicle changes the mode of coolant supply such that coolant supply to the motor is relatively greater when a quantity of charge of the battery for supplying electric power to the motor is large as compared to a case where the quantity of charge of the battery is small.

According to another embodiment of the present invention, the coolant supply to the motor is performed by an electric pump, and a work rate of the electric pump is changed in accordance with the state of charge of the battery.

Advantageous Effects of Invention

According to the present invention, in a hybrid vehicle which runs using power of at least one of an engine and a motor, the distance the vehicle can run with power of the motor only can be further increased than in the past, so that fuel efficiency can be enhanced.

BEST MODE FOR CARRYING OUT THE INVENTION

Preferred embodiments of the present invention will be described with reference to the drawings. It should be noted, however, that the following embodiment is only an example, and the present invention is not limited to the following embodiment.

Figure 1:
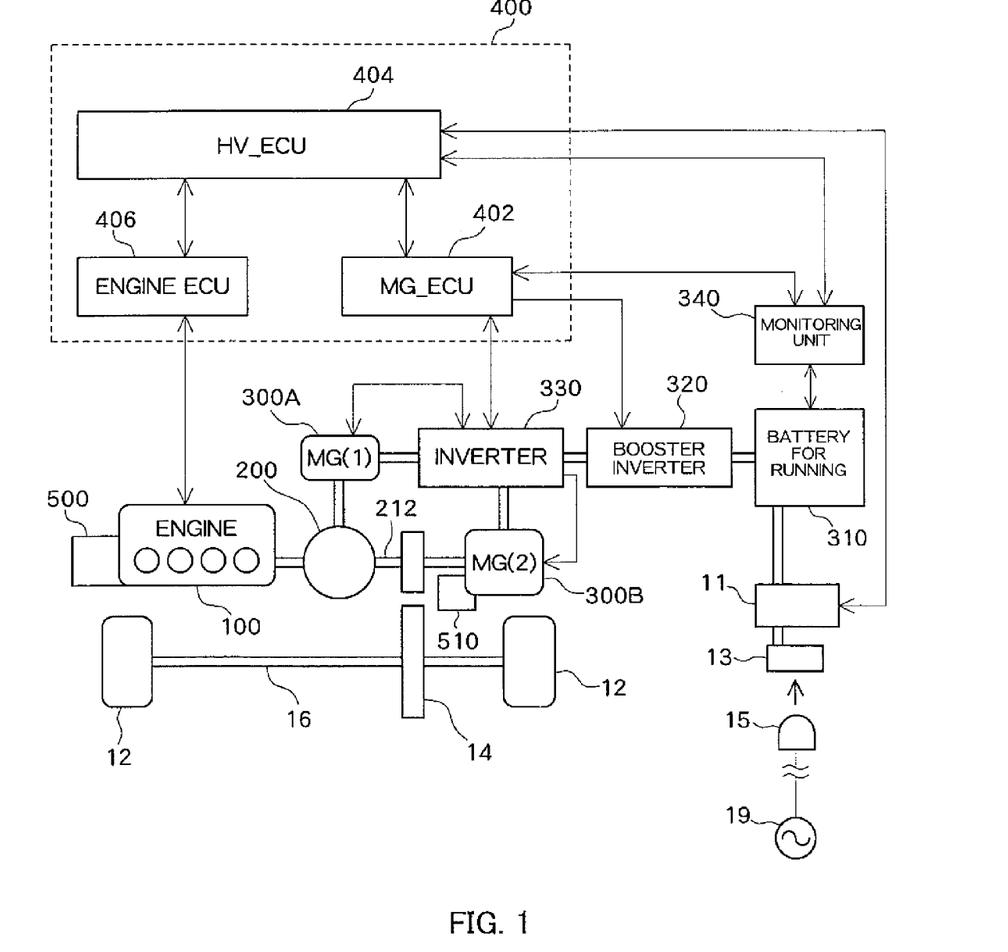
FIG. 1 View illustrating a system configuration according to an embodiment.

FIG. 1 illustrates a system configuration of a hybrid vehicle 10 according to the present embodiment. The hybrid vehicle 10 is a plug-in hybrid vehicle, for example. The vehicle 10 runs using power of at least one of an engine 100 and a second motor generator MG(2) 300B. A battery for running 310 which supplies electric power to the MG(2) 300B and other components can be charged with electric power from an alternating current power source 19 external to the vehicle, such as a household power source.

The vehicle 10 includes, in addition to the engine 100, the MG(2) 300B, and the battery for running 310, a power distributing mechanism 200, a decelerator 14, an inverter 330, a booster converter 320, an engine ECU 406, an MGECU 402, an HVECU 404, and other elements.

The power distributing mechanism 200 distributes the power generated by the engine 100 to an output shaft 212 and a first motor generator MG(1) 300A. With the engine 100, the MG(1) 300A, and the MG(2) 300B being coupled via the power distributing mechanism 200, the revolution rate of each of the engine 100, the MG(1) 300A, and the MG(2) 300B is determined such that, upon determination of the revolution rates of any two, the revolution rate of the remaining one can be determined.

The decelerator 14 transmits the power generated by the engine 100, the MG(1) 300A, and the MG(2) 300B, to driving wheels 12, or transmits drive of the driving wheels 12 to the engine 100, the MG(1) 300A, and the MG(2) 300B.

The inverter 330 mutually converts direct current of the battery for running 310 and alternating current of the MG(1) 300A and the MG(2) 300B.

The booster converter 320 performs voltage conversion between the battery for running 310 and the inverter 330.

The engine ECU 406 controls an operation state of the engine 100. The MGECU 402 controls the charge/discharge state of the MG(1) 300A, the MG(2) 300B, the inverter 330, and the battery for running 310, in accordance with the state of the vehicle 10. The HVECU 404 mutually manages and controls the engine ECU 406 and the MGECU 402 to thereby control the whole system such that the vehicle 10 can run in the most efficient manner. The engine ECU 406, the MGECU 402, and the HVECU 404 may be combined in a single ECU rather than forming separate components. FIG. 1 illustrates that these three ECUs are combined into a single ECU 400.

The ECU 400 receives signals from a vehicle speed sensor, an accelerator position sensor, a throttle opening sensor, an MG(1) rotation speed sensor, an MG(2) rotation speed sensor, an engine rotation speed sensor, an MG(1) temperature sensor, an MG(2) temperature sensor, and a monitoring unit 340 which monitors the state of the battery for running. The ECU 400, when the MG(1) 300A or the MG(2) 300B is caused to function as a motor, boosts the direct current power from the battery for running 310 with the booster converter 320 and thereafter converts the boosted direct current power to alternating current power with the inverter and supplies the power to the MG(1) 300A and the MG(2) 300B. Further, when charging the battery for running 310, the ECU 400 causes the MG(1) 300A to generate electricity by the power of the engine 100 transmitted via the power distributing mechanism 200 or causes the MG(2) 300B to generate electricity by running energy of the vehicle transmitted via the decelerator 14. The ECU 400 converts the alternating current power generated by the MG(1) 300A or the MG(2) 300B to direct current power with the inverter 300, reduces the direct current power by the booster converter 320, and supplies the power to the battery for running 310. It is also possible that the ECU 400 converts the alternating current power from the alternating current source 19 to direct current power and supplies the direct current power to the battery for running 310, thereby charging the battery for running 310.

The vehicle has, as running modes, a mode in which running with the power of the MG(2) 300B without using the power of the engine 100 (EV running) is preferentially performed and a mode in which running with power of both the engine 100 and the MG(2) 300B (HV running) is performed. The mode in which the EV running is preferentially performed is a mode which gives preference to consumption of the power of the battery for running 310 over preservation of the power. As a basic control operation, the ECU 400 monitors the SOC of the battery for running 310, and maintains this EV running mode when the state of charge (SOC) of the battery for running 310 is a predetermined value or higher and also until the motor temperature detected by the MG(2) temperature sensor reaches a threshold temperature. When the motor temperature exceeds the threshold temperature, the ECU 400 releases the EV running mode and shifts to the control for limiting the load on the MG(2) 300B. If the state of charge (SOC) of the battery for running 310 is less than the predetermined value, the control mode is shifted to the HV running mode.

With the engine 100 of the vehicle is coupled a mechanical oil pump (MOP) 500 which is driven by power from the engine 100 to draw oil stored in an oil pan by suction and feed the oil to a portion of the engine 100 to be lubricated and a portion of the power distribution mechanism 200 to be lubricated. On the other hand, the MG(2) 300B of the vehicle 10 is coupled with an electric oil pump (EOP) 510 which is driven by power from the MG(2) 300B to draw oil stored in an oil pan by suction and supply the oil to coils of the MG(2) 300B for cooling.

The vehicle 10 further includes a connector 13 for connecting a paddle 15 connected to the alternating current power source 19, and a charging device 11 which converts the power from the alternating current power source 19 supplied via the connector 13 to the direct current and supplies the current to the battery for running 310. The charging device 11 controls a quantity of power for charging the battery for running 310 in accordance with a control signal from the HVECU 404.

Figure 2:
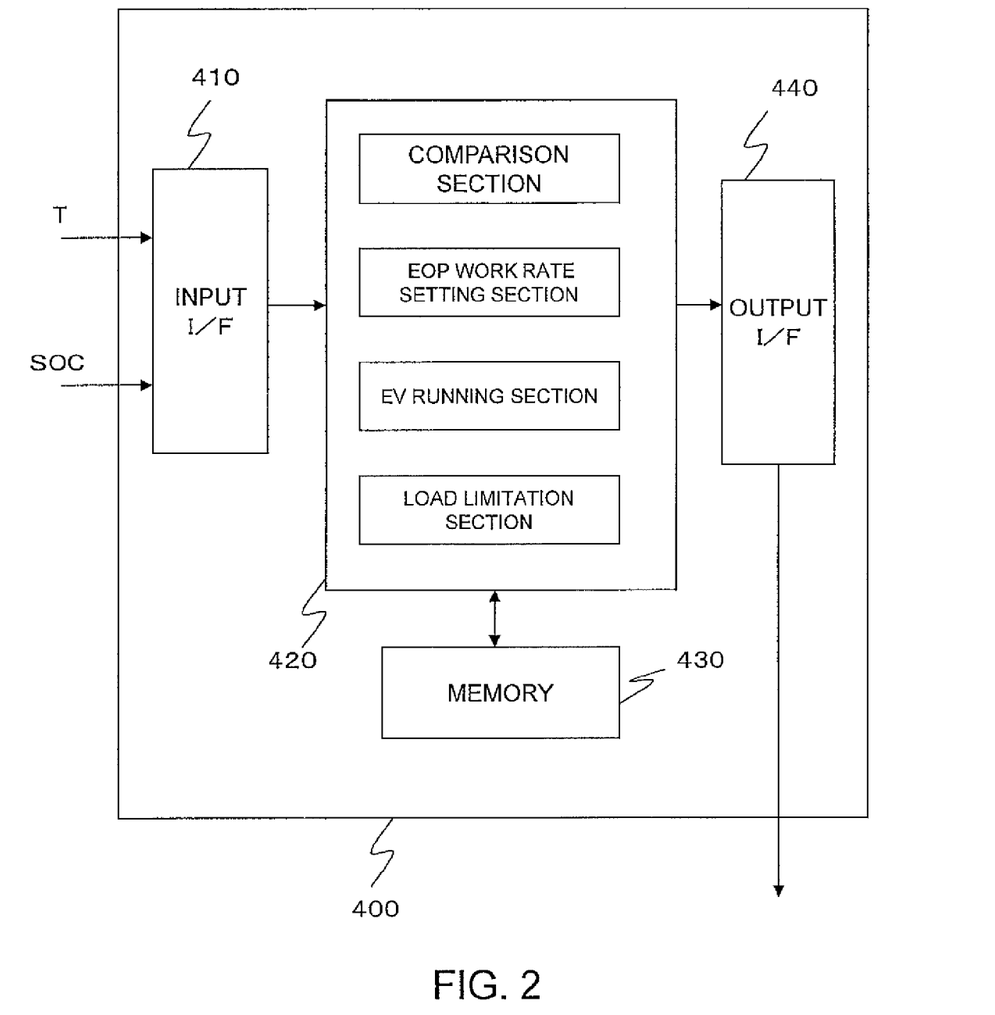
FIG. 2 Block diagram illustrating the configuration of an ECU.

FIG. 2 is a block diagram illustrating the configuration of the ECU 400. The ECU 400 includes an input interface I/F 410, an operation section (processor) 420, a memory 430, and an output interface I/F 440.

As described above, the input interface I/F 410 receives signals from the vehicle speed sensor, the accelerator position sensor, the throttle opening sensor, the MG(1) rotation speed sensor, the MG(2) rotation speed sensor, the engine rotation speed sensor, the MG(1) temperature sensor, the MG(2) temperature sensor, and the monitoring unit 340 which monitors the state of the battery for running. The drawing only indicates a motor temperature T of the MG(2) detected by the MG(2) temperature sensor and the state of charge (SOC) of the battery for running 310.

The operation section 420 includes, as a function block, a comparison section, an EOP work rate setting section, an EV running control section, and a load limitation section. The comparison section compares the detected motor temperature of the MG(2) 300B with the threshold temperature and determines whether or not the motor temperature T exceeds the threshold temperature Tth. The EOP work rate setting section sets the work rate (or an output value) of the EOP 510 in accordance with the SOC of the battery for running 301. More specifically, the FOP work rate setting section accesses the memory 430 and sets the work rate based on a predetermined relationship between the SOC and the work rate of the EOP 510 stored in the memory 430. The EV running control section controls driving of the MG(2) 300B and the engine 100 so as to control running of the vehicle 10 in the EV running mode. The load limitation section performs various controls for limiting the load on the MG(2) 300B based on the comparison result of the comparison section. More specifically, the load limitation section limits the load on the MG(2) when the motor temperature T exceeds the threshold temperature Tth in the comparison section, and does not limit the load on the MG(2) and maintains the EV running mode when the motor temperature T does not exceed the threshold temperature Tth.

An output interface I/F 440 outputs the processing result in the operation section 420 as a control command.

The memory 430 previously stores the relationship between the SOC of the battery for running 310 and the work rate of the EOP 510, as described above.

Figure 3:
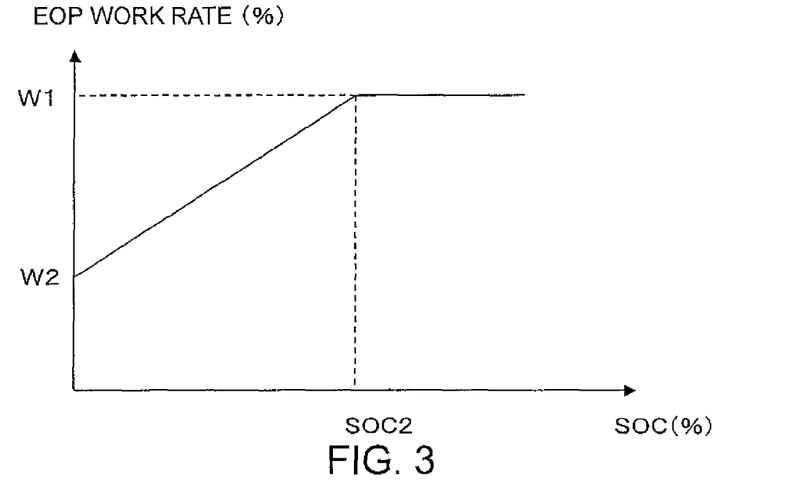
FIG. 3 Graph indicating a relationship between SOC and the work rate of an electric oil pump (EOP).

FIG. 3 indicates a relationship between the SOC of the battery for running 310 and the work rate of the EOP 510. The SOC is expressed in percentage with the full charged state being expressed as 100. The work rate of the FOP 510 is expressed in a ratio (duty ratio) of a driving time to a non-driving time. The duty ratio is 100% in the case of continuous driving, and the duty ratio is 50% when the driving time and the non-driving time are half and half. The greater the duty ratio, the greater the quantity of oil drawn from the oil pan by suction and supplied to the portions to be cooled, and therefore the higher the cooling performance. As indicated by the drawing, as the SOC increases, the work rate of the EOP 510 increases from W2 to W1, and when the SOC reaches SOC2, the work rate reaches W1, which is thereafter maintained regardless of the SOC. While W1 and W2 can be set as desired, W2 is set to 30% and W1 is set to 100%, for example. SOC2, which also can be set as desired, is set to 60%, for example.

The work rate of the EOP 510 is increased as the SOC of the battery 310 for running increases, for the following reasons. When the SOC of the battery for running 310 increases, as there is a sufficient storage quantity of the battery for running 310, the storage quantity of the battery for running 310 should be consumed as much as possible to drive the MG(2) 300B as a motor and to maintain the EV running mode in which the vehicle runs only with the power of the MG(2) 300B, thereby increasing the running distance based on the EV running mode. On the other hand, even if there is a sufficient storage quantity of the battery 310 for running, when the motor temperature of the MG(2) 300B increases to exceed the threshold temperature, it is necessary to shift to the load limitation control for limiting the load on the MG(2) 300B in order to prevent malfunction of and damages to the MG(2) 300B.

Accordingly, as the SOC of the battery 310 for running increases, the work rate of the EOP 510 is increased to increase the cooling performance for the coils of the MG(2) 300B, thereby performing control such that the motor temperature of the MG(2) 300B does not reach the threshold temperature for maintaining the EV running mode.

Figure 4:
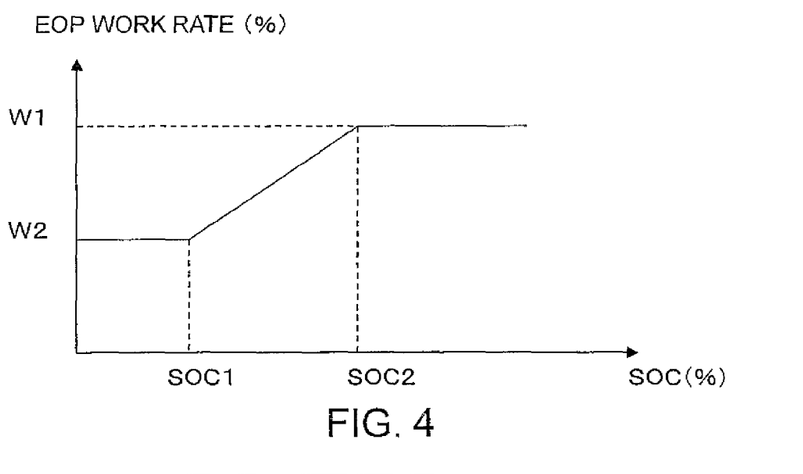
FIG. 4 Graph indicating another relationship between SOC and the work rate of an electric oil pump (EOP).

FIG. 4 illustrates another relationship between the SOC of the battery 310 for running and the work rate of the EOP 510. While the duty ratio remains at W2 until the SOC reaches SOC1, the duty ratio increases linearly in accordance with the SOC when the SOC exceeds SOC1, and the duty ratio is fixed to W1 when the SOC exceeds SOC2 (SOC1<SOC2). While W1 and W2 can be set as desired, W2 is set to 30% and W1 is set to 100%, for example. While SOC1 and SOC2 also can be set as desired, SOC1 is set to 50% and SOC2 is set to 60%, for example.

As described above, with the work rate of the EOP 510 being increased in accordance with the SOC, the temperature rise in the motor temperature of the MG(2) 300B is inhibited, to thereby increase the length of time until the motor temperature reaches the threshold temperature, so that the running distance based on the EV running mode can be increased.

While FIGS. 3 and 4 specify the relationships between the SOC and the work rate (duty ratio) of as a function, the relationships can be specified as a table.

Figure 5:
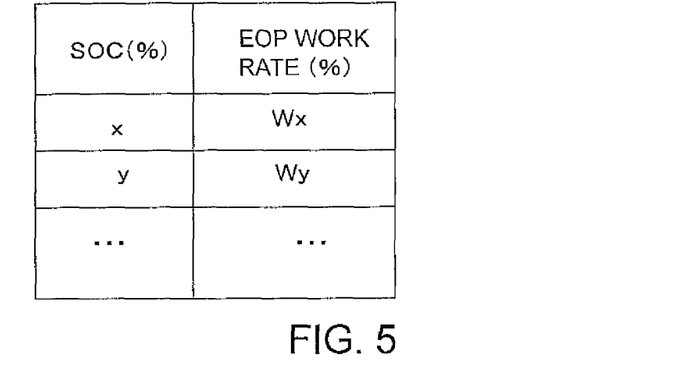
FIG. 5 Table explanatory view indicating a relationship between SOC and the work rate of an electric oil pump (EOP).

FIG. 5 illustrates an example table specifying the relationship between the SOC and the work rate. For each SOC, the corresponding work rate (duty ratio) is specified. For example, when the SOC is x (%), the duty ratio is Wx (%), and when the SOC is y (%), the duty rate is Wy (%). More specifically, when the SOC is 50%, the duty ratio is 30%. When the SOC is 70%, the duty ratio is 100%. The memory 430 stores the relationships between the SOC and the work rate, as the functions indicated in FIGS. 3 and 4 or as the table indicated in FIG. 5. The operation section within the ECU 400 uses such a relationship stored in the memory 430 to control the motor temperature T of the MG(2) 300B, and outputs a control command for switching the EV running mode and the load limitation based on the comparison result between the motor temperature T and the threshold temperature.

Figure 6:
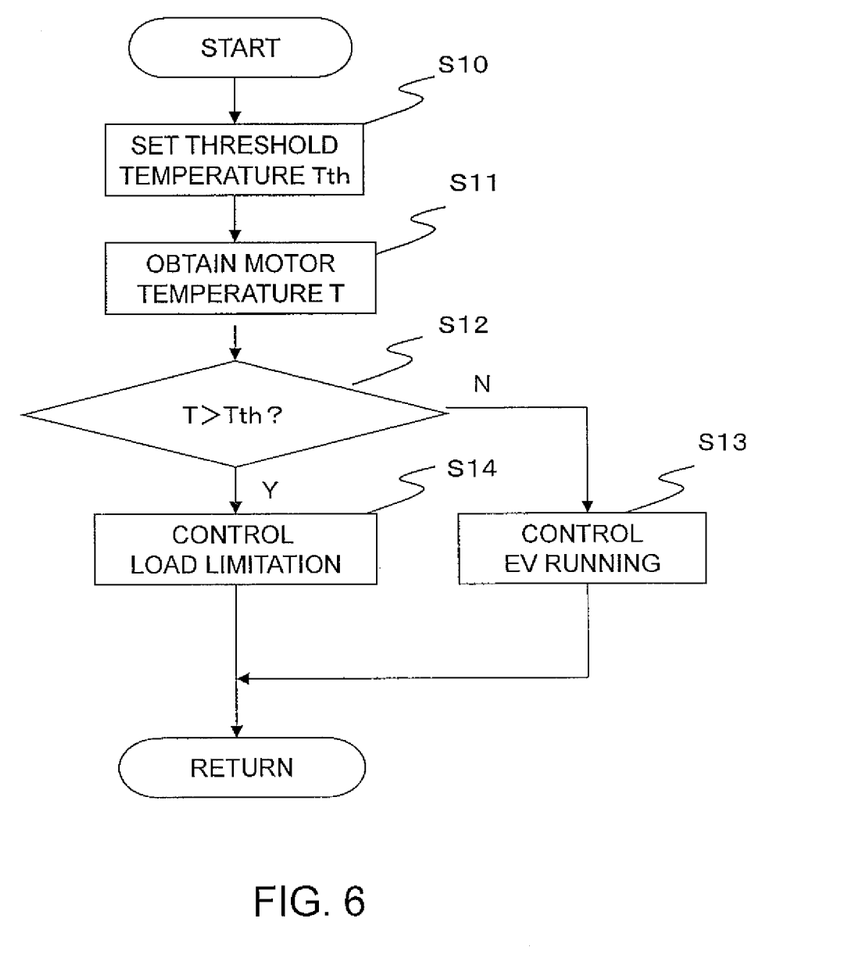
FIG. 6 Flow chart illustrating processing according to the embodiment.

FIG. 6 illustrates a processing flowchart of basic processing of the ECU 400 according to the present embodiment. First, the ECU 400 sets the threshold temperature Tth (S10). The threshold temperature Tth is preset in accordance with the type of the MG(2) 300B or the type of a vehicle in which the MG(2) 300B is mounted.

The ECU 400 then obtains the motor temperature T of the MG(2) 300B (S11).

After obtaining the motor temperature T, the EUC 400 compares the obtained motor temperature with the threshold temperature Tth (S12).

When the comparison result does not indicate T>Tth; i.e., when the motor temperature of the MG(2) 300B does not exceed the threshold temperature Tth, the ECU 400 controls to maintain the EV running mode in which the vehicle runs only with the power of the MG(2) 300B (S13). It is a matter of course that when the vehicle runs in the EV running mode, it is a precondition that the SOC of the battery 310 for running exceeds a predetermined lower limit value of the SOC. When the comparison result indicates T>Tth; i.e., when the motor temperature of the MG(2) 300B exceeds the threshold temperature Tth, the EV running control is shifted to the load limitation control (S14). While in the load limitation control, with the load on the MG(2) 300B being limited, the power of the engine 100 is used in addition to the power of the MG(2) 300B, the load limitation control is not limited to this example, and may be performed with a change in the deceleration ratio in the decelerator 14 or a change in the engine torque.

Figure 7:
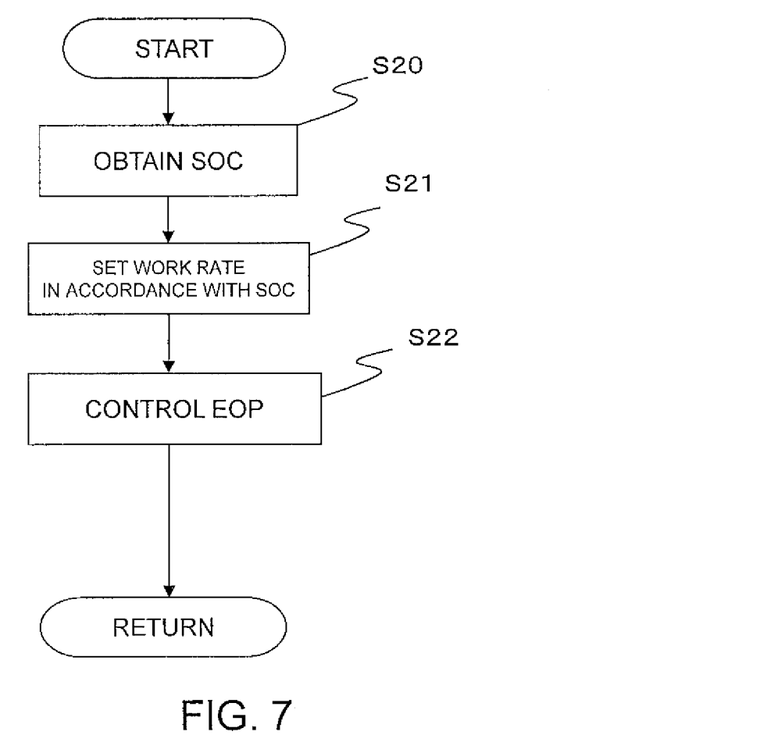
FIG. 7 Flow chart illustrating processing according to the embodiment.

FIG. 7 illustrates an interruption processing flowchart of the ECU 400 according to the present embodiment. The ECU 400 obtains the SOC of the battery 310 for running (S20).

The ECU 400 then accesses the memory 430 and sets the work rate (duty ratio) of the EOP 510 in accordance with the SOC which is obtained (S21).

Upon setting the work rate of the EOP 510 in accordance with the SOC of the battery 310 for running, the ECU 400 drives the EOP 510 at the work rate which is thus set for cooling the MG(2) 300B (S22). More specifically, a pump control section which is configured to distribute the power of the MG(2) 300B and drive the EOP 510 to rotate is provided for controlling the rotation speed of the EOP 510, and the ECU 400 supplies a control command in accordance with the work rate which is set to the pump control section and then controls the rotation speed of the EOP 510 to supply oil to a predetermined portion of the MG(2) 300B to be cooled at the work rate which is set. By cooling the MG(2) 300B, the motor temperature T of the MG(2) 300B is inhibited from reaching the threshold temperature Tth, to thereby prevent the determination of YES in the processing in step S12 of FIG. 6; i.e., the determination that the motor temperature T exceeds the threshold temperature Tth, thereby inhibiting shift from the EV running mode to the load limitation mode.

In the present embodiment, the work rate of the EOP 510 is increased when the SOC of the battery 310 for running is relatively high. Here, as the EOP 510 is driven by the power of the MG(2) 300B, which is, in turn, driven by the electric power from the battery 310 for running, when the work rate of the EOP 510 is increased, a rate of a reduction in the SOC of the battery 310 for running increases as compared to the case where the work rate of the EOP 510 is maintained. However, even in such a case, if the SOC of the battery 310 for running is sufficient, it is possible to maintain the EV running mode and also to prevent the motor temperature T from exceeding the threshold temperature Tth. In other words, while in the case in which the work rate of the EOP 510 is fixed, the timing for shifting from the EV running mode to the load limitation mode because of the motor temperature T exceeding the threshold temperature Tth is earlier than the timing for shifting from the EV running mode to the load limitation mode because of the SOC of the battery 310 for running being below the predetermined lower limit value, according to the present embodiment, the work rate of the EOP 510 is increased to thereby delay the timing at which the motor temperature T exceeds the threshold temperature Tth and extend the time length in which the EV running mode is maintained.

While in the present embodiment, the relationships between the SOC and the work rate illustrated in FIGS. 3 and 4 are used, other relationships may also be adopted.

Figure 8:
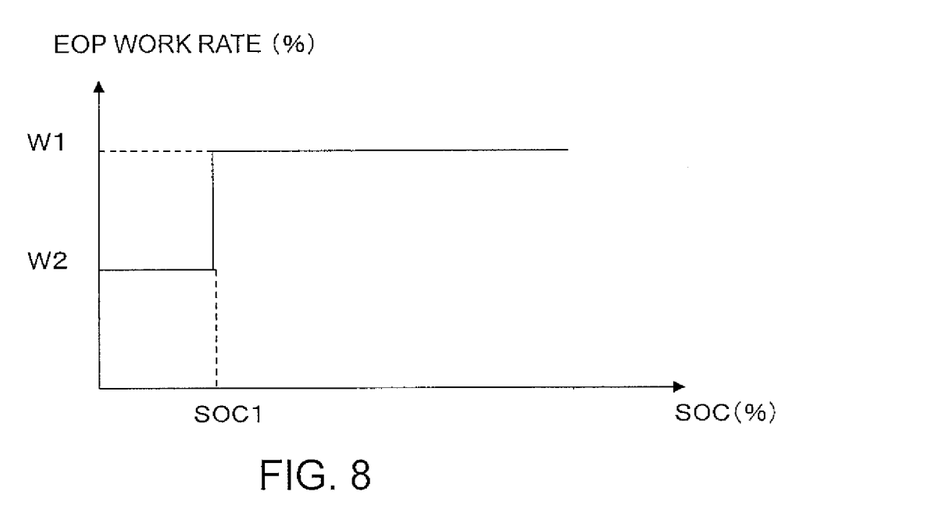
FIG. 8 Graph indicating still another relationship between SOC and the work rate of an electric oil pump (EOP).

FIG. 8 indicates another relationship between the SOC and the work rate, in which while the work rate is a fixed value W2 when the SOC of the battery 310 for running is SOC1 or less, the work rate increases to W1 once the SOC exceeds SOC1. Specifically, the work rate varies stepwise or discontinuously in accordance with the SOC. In this case, as the work rate increases from W2 to W1 once the SOC exceeds SOC1, it is possible to cool the MG(2) 300B more intensely.

While in the present embodiment, the EOP 510 is driven by power of the MG(2) 300B, an additional motor, which is separate from the MG(2) 300B, may be used to drive the EOP 510. This separate motor may be driven by an additional battery which is separate from the battery 310 for running, such as an auxiliary battery. If the EOP 510 is driven by an auxiliary battery, the work rate of the EOP 510 which is driven by the auxiliary battery is variably set in accordance with the SOC of the battery 310 for running.

Also, while in the present embodiment, the EOP 510 is used to cool the MG(2) 300B, the present invention is not limited to this structure, and any cooling unit configured to supply a coolant to the MG(2) 300B for cooling the MG(2) 300B can be used. However, such a cooling unit needs to be driven in the EV running mode and needs to be driven when the engine 100 is not operated. Further, while in the present embodiment, the work rate of the EOP 510 is indicated as an example, the present invention is not limited to this example, and any cooling performance of any cooling unit can be used as an index. The cooling performance may include a coolant supply quantity, a coolant supply time, power or output of the coolant supply pump, and other performances. As such, the present invention includes any technology for adjusting the cooling performance of a cooling unit which is used to cool a motor driven in the EV running mode, based on the SOC of the battery for supplying electric power to the motor, such that the cooling performance is high when the SOC is relatively high.

REFERENCE SYMBOLS 10 vehicle, 100 engine, 300A MG(1), 300B MG(2), 310 battery for running, 400 ECU.

The invention claimed is:

1. A control device for a hybrid vehicle, the hybrid vehicle having an engine and a motor, the control device comprising:
    an electronic control unit configured to:
        operate the hybrid vehicle in a motor load limited running mode in which the hybrid vehicle runs with a motor load being limited when a temperature of the motor exceeds a threshold temperature, and
        when the hybrid vehicle is operating in a mode other than the motor load limited running mode, suppress the temperature of the motor from exceeding the threshold temperature by increasing a cooling performance of a coolant supply to the motor as a state of charge of a battery for supplying electric power to the motor increases, so that the cooling performance is greater when the state of charge is relatively high compared to the cooling performance when the state of charge is relatively low.

2. The control device according to claim 1, wherein the electronic control unit increases the cooling performance by increasing a rate of the coolant supply.

3. The control device according to claim 1, wherein the electronic control unit varies the cooling performance of the coolant supply by varying a work rate of an electric pump that supplies the coolant to the motor.

4. The control device according to claim 1, wherein the electronic control unit is configured to suppress the temperature of the motor from exceeding the threshold temperature by, when the temperature of the motor is less than the threshold temperature, increasing the cooling performance of the coolant supply to the motor as the state of charge of the battery for supplying electric power to the motor increases.

5. The control device according to claim 1, further comprising:
a temperature sensor, coupled to the electronic control unit, and configured to sense the temperature of the motor.

* * * * *